United States Patent [19]
Tran et al.

[11] Patent Number: 5,983,321
[45] Date of Patent: Nov. 9, 1999

[54] CACHE HOLDING REGISTER FOR RECEIVING INSTRUCTION PACKETS AND FOR PROVIDING THE INSTRUCTION PACKETS TO A PREDECODE UNIT AND INSTRUCTION CACHE

[75] Inventors: Thang M. Tran; Karthikeyan Muthusamy; Rammohan Narayan; Andrew McBride, all of Austin, Tex.

[73] Assignee: Advanced Micro Devices, Inc., Sunnyvale, Calif.

[21] Appl. No.: 08/815,567

[22] Filed: Mar. 12, 1997

[51] Int. Cl.[6] ............................. G06F 12/00; G06F 13/00
[52] U.S. Cl. ............................. 711/125; 711/3; 711/118; 711/119; 711/130; 711/137; 711/149; 711/154; 711/167; 712/1; 712/200; 712/207
[58] Field of Search ........................... 711/3, 118, 119, 711/125, 130, 137, 149, 154, 167; 395/800; 712/1, 200, 207

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 708/508 |
| 5,058,048 | 10/1991 | Gupta et al. | 708/508 |
| 5,129,067 | 7/1992 | Johnson | 395/389 |
| 5,136,697 | 8/1992 | Johnson | 395/586 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," 1994, pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Tuan V. Thai
*Attorney, Agent, or Firm*—Conley, Rose & Tayon, PC; B. Noel Kivlin; Lawrence J. Merkel

[57] ABSTRACT

An instruction cache employing a cache holding register is provided. When a cache line of instruction bytes is fetched from main memory, the instruction bytes are temporarily stored into the cache holding register as they are received from main memory. The instruction bytes are predecoded as they are received from the main memory. If a predicted-taken branch instruction is encountered, the instruction fetch mechanism within the instruction cache begins fetching instructions from the target instruction path. This fetching may be initiated prior to receiving the complete cache line containing the predicted-taken branch instruction. As long as instruction fetches from the target instruction path continue to hit in the instruction cache, these instructions may be fetched and dispatched into a microprocessor employing the instruction cache. The remaining portion of the cache line of instruction bytes containing the predicted-taken branch instruction is received by the cache holding register. In order to reduce the number of ports employed upon the instruction bytes storage used to store cache lines of instructions, the cache holding register retains the cache line until an idle cycle occurs in the instruction bytes storage. The same port ordinarily used for fetching instructions is then used to store the cache line into the instruction bytes storage. In one embodiment, the instruction cache prefetches a succeeding cache line to the cache line which misses. A second cache holding register is employed for storing the prefetched cache line.

19 Claims, 5 Drawing Sheets

U.S. PATENT DOCUMENTS

| | | | |
|---|---|---|---|
| 5,148,537 | 9/1992 | Belsan | 711/131 |
| 5,170,476 | 12/1992 | Laakso et al. | 711/140 |
| 5,179,680 | 1/1993 | Colwell et al. | 711/125 |
| 5,226,126 | 7/1993 | McFarland et al. | 395/394 |
| 5,226,130 | 7/1993 | Favor et al. | 395/385 |
| 5,301,295 | 4/1994 | Leary et al. | 711/125 |
| 5,450,561 | 9/1995 | Ryan | 711/125 |
| 5,454,093 | 9/1995 | Abdulhafiz et al. | 711/167 |
| 5,465,344 | 11/1995 | Hirai et al. | 711/131 |
| 5,511,178 | 4/1996 | Takeda et al. | 711/125 |
| 5,623,615 | 4/1997 | Salem et al. | 395/585 |
| 5,651,125 | 7/1997 | Witt et al. | 395/394 |
| 5,689,672 | 11/1997 | Witt et al. | 395/329 |

CACHE HOLDING REGISTER FOR RECEIVING INSTRUCTION PACKETS AND FOR PROVIDING THE INSTRUCTION PACKETS TO A PREDECODE UNIT AND INSTRUCTION CACHE

BACKGROUND OF THE INVENTION

1. Field of the Invention

This invention relates to the field of microprocessors and, more particularly, to mechanisms for fetching instruction bytes into an instruction cache from a main memory subsystem.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Recently, the trend in microprocessor frequencies has been toward increasingly higher rates (i.e. shorter clock cycles). Frequencies in the range of 200–300 MHz are becoming common. At the same time, main memory access times have remained relatively constant. Therefore, the number of clock cycles which expire while the processor awaits data or instruction bytes from the main memory has been increasing. The increased number of clock cycles spent waiting for a memory response tends to decrease the potential performance of the microprocessor (e.g. if memory access times were faster, the microprocessor may be able to achieve a greater performance level).

While important for both instruction and data accesses, superscalar microprocessors are particularly sensitive to delays in receiving instructions. Speculative execution of instructions, often employed by superscalar microprocessors, may allow execution of instructions subsequent to an instruction which is stalled awaiting data from memory. Therefore, the number of instructions executed per clock cycle may remain high, even in the face of long main memory data accesses. However, if the instructions to be executed are not stored in an internal instruction cache of the microprocessor, the microprocessor must fetch the instructions from the main memory. The microprocessor must then await the return of the instructions in response to the fetch before proceeding forward with the execution of the instructions. Any instructions subsequent to the instructions being fetched from main memory, even if the subsequent instructions are stored in the instruction cache, cannot be fetched and/or dispatched until the main memory responds. Superscalar microprocessors are greatly affected by the wait for instructions since they attempt to execute multiple instructions concurrently and hence require a high instruction fetch bandwidth. Average instruction fetch bandwidth is decreased due to the lack of instructions provided while awaiting instructions fetched from memory.

Because the wait incurred when fetching instructions from a main memory is long, it is important to store a cache line of instructions within the instruction cache when the cache line is fetched from main memory. However, often times a branch instruction may exist within the first few instructions of the cache line of instructions being fetched. If the branch instruction is to be predicted taken, the remaining instructions within the cache line are not immediately needed. More importantly, instructions from another cache line containing the target of the branch instruction are immediately needed. Such other cache line may be stored in the instruction cache. Nonetheless, the remaining instructions of the cache line of instructions being transferred from the main memory may be subsequently fetched by the microprocessor (either because the branch instruction is mispredicted or according to the continued execution of the program). A mechanism for fetching cache lines from main memory which balances the need to quickly locate and predict branch instructions and the need to store cache lines of instructions into the cache is desired.

As used herein, the term "cache line" refers to the smallest unit of memory manipulated by a cache. The bytes within the cache line are allocated space and deallocated space within the cache as a unit. Cache lines are typically aligned in memory, such that each byte within the line may be located by an offset which forms the least significant bits of the address. For cache lines having a number of bytes which is an even power of two, the number of least significant bits of the address forming the offset is the power.

SUMMARY OF THE INVENTION

The problems outlined above are in large part solved by an instruction cache employing a cache holding register as described herein. When a cache line of instruction bytes is fetched from main memory, the instruction bytes are temporarily stored into the cache holding register as they are received from main memory. The instruction bytes are predecoded as they are received from the main memory. If a predicted-taken branch instruction is encountered, the instruction fetch mechanism within the instruction cache begins fetching instructions from the target instruction path. This fetching may be initiated prior to receiving the complete cache line containing the predicted-taken branch instruction. As long as instruction fetches from the target instruction path continue to hit in the instruction cache, these instructions may be fetched and dispatched into a microprocessor employing the instruction cache. Advantageously, continued instruction fetching and execution at the target of the branch instruction may be performed prior to receiving the complete cache line containing the branch instruction. Performance of the microprocessor employing the cache holding register may thereby be increased.

The remaining portion of the cache line of instruction bytes containing the predicted-taken branch instruction is received by the cache holding register. In order to reduce the number of ports employed upon the instruction bytes storage used to store cache lines of instructions, the cache holding register retains the cache line until an idle cycle occurs in the instruction bytes storage. The same port ordinarily used for fetching instructions is then used to store the cache line into the instruction bytes storage. Advantageously, the overall size of the instruction bytes storage (which is proportional to the number of ports thereon) may be minimized using the cache holding register.

In one embodiment, the instruction cache prefetches a succeeding cache line to the cache line which misses. A second cache holding register is employed for storing the prefetched cache line. After the cache line of instruction bytes stored in the first cache holding register is stored into the instruction bytes storage, the contents of the second cache holding register are shifted into the first cache holding register. Subsequently, the prefetched cache line may be stored into the instruction bytes storage as well.

Broadly speaking, the present invention contemplates a method for retrieving a cache line of instruction bytes from a main memory subsystem and storing the cache line of instruction bytes into an instruction cache of a microprocessor. A cache holding register is allocated for the cache line of instruction bytes. The cache holding register is configured to store an address corresponding to the cache line of instruction bytes, and further includes storage for the cache line of instruction bytes. One or more packets of instruction bytes are received into the cache holding register. The received packets include a predicted-taken branch instruction. The received packets are predecoded as the packets are received. A second cache line of instruction bytes is fetched from the instruction cache in response to the predicted-taken branch instruction. Concurrently, the remaining packets of instruction bytes are received into the cache holding register. The cache line of instruction bytes is stored into the instruction cache subsequent to receiving the remaining packets.

The present invention further contemplates an instruction cache comprising an instruction bytes storage, a cache holding register, a multiplexor, and a control unit. The instruction bytes storage is provided for storing cache lines of instruction bytes. The cache holding register is configured to store an address of a first cache line of instruction bytes. The first cache line of instruction bytes is being fetched from a main memory subsystem. Additionally, the cache holding register includes storage for the first cache line of instruction bytes. Coupled between the cache holding register and the instruction bytes storage, the multiplexor is configured to select between the address stored in the cache holding register and a fetch address corresponding to instructions being fetched by a microprocessor including the instruction cache. The control unit is configured to control the multiplexor. In particular, the control unit is configured to cause the multiplexor to select the address stored in the cache holding register if the first cache line of instruction bytes is stored within the cache holding register and the fetch address is inhibited.

BRIEF DESCRIPTION OF THE DRAWINGS

Other objects and advantages of the invention will become apparent upon reading the following detailed description and upon reference to the accompanying drawings in which.

Figure 1:
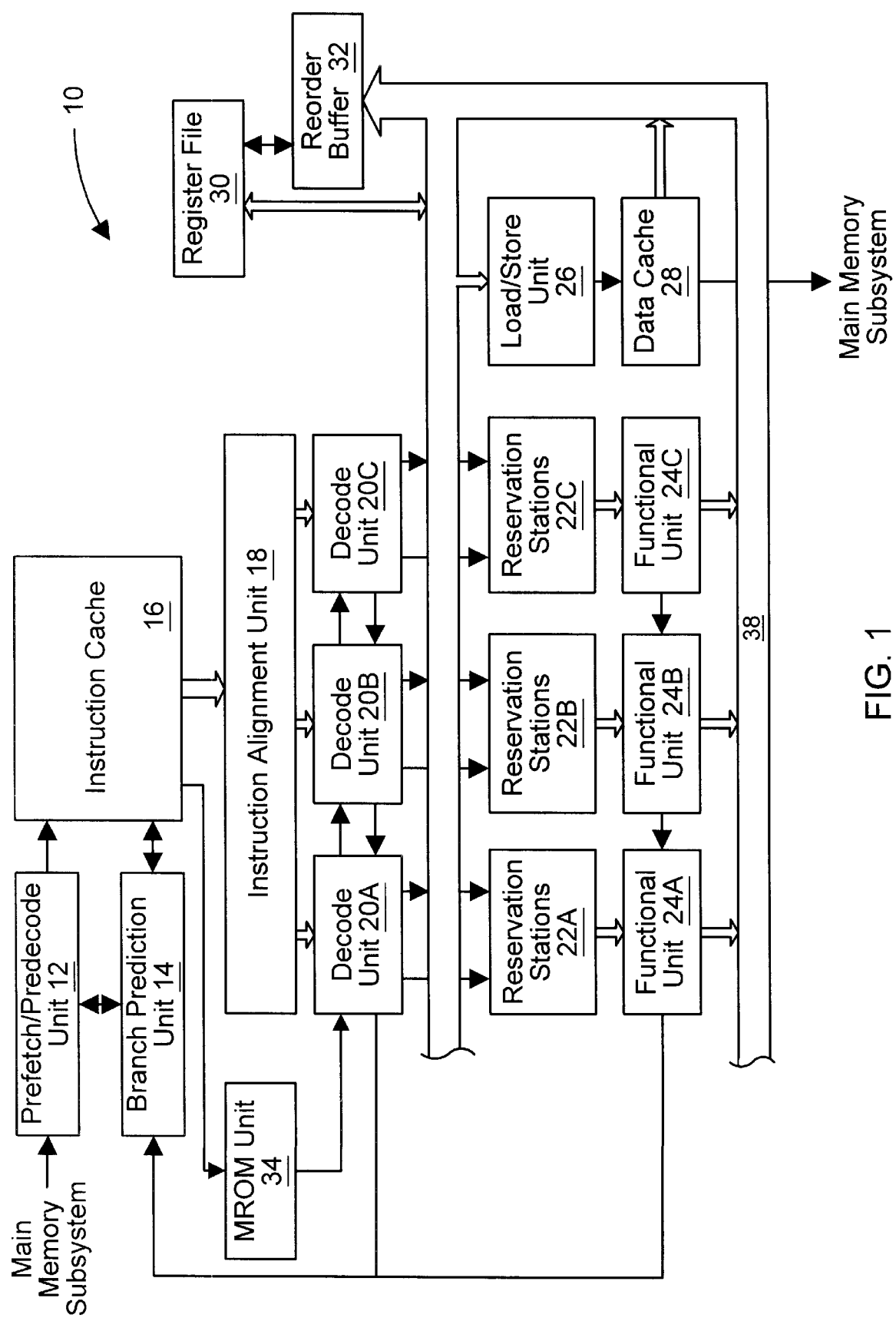
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, microprocessor 10 fetches cache lines of instructions from a main memory subsystem (not shown) when an instruction fetch misses instruction cache 16. An instruction fetch is said to "miss" instruction cache 16 if the cache line of instructions to which the instruction fetch refers is not stored within instruction cache 16. If the cache line of instructions is stored in instruction cache 16, the instruction fetch referring to that cache line is said to "hit" instruction cache 16.

The interface between the main memory subsystem and instruction cache 16 (and prefetch/predecode unit 12) is narrower than the width of a cache line. Therefore, multiple packets are transmitted to instruction cache 16 to convey a cache line of instructions thereto. The first packet received is the packet containing the byte indicated by the least significant bits of the address, and the other packets are received thereafter. In one embodiment, packets comprise 8 bytes each and 4 packets comprise an instruction cache line.

As the packets are received, the instruction bytes therein are predecoded by prefetch/predecode unit 12. If the instructions correspond to an instruction fetch generated in response to program execution (as opposed to a prefetch of the instructions prior to the instructions being requested), then the instructions are passed into the instruction processing pipeline of microprocessor 10 after being predecoded. If prefetch/predecode unit 12 detects a branch instruction and the branch instruction is predicted taken, then prefetch/predecode unit 12 provides the branch prediction information to branch prediction unit 14 for storage. Furthermore, the predicted target address of the predicted taken branch instruction is provided to instruction cache 16 as a fetch address. If the predicted target address is stored in the cache, instructions from the predicted target are dispatched into the instruction processing pipeline. Advantageously, predicted taken branches within a cache line of instructions being fetched from the main memory subsystem may be located prior to receiving the complete cache line. Furthermore, instructions from the target address may be fetched prior to receiving the complete cache line as well. In such situations, the remaining instructions in the instruction cache line (e.g. those instructions which are subsequent to the predicted taken branch instruction) are not immediately needed by microprocessor 10. However, the remaining packets of the cache line of instructions are subsequently transmitted into microprocessor 10 from the main memory subsystem.

Microprocessor 10 employs a cache holding register for receiving cache lines of instructions from the main memory subsystem. The cache holding register stores the address identifying the cache line of instructions, as well as the way selected for storing the cache line within instruction cache 16 (for set associative embodiments). Additionally, the cache holding register stores the instruction bytes as they are received in the packets transmitted from the main memory subsystem. Once all the packets have been received, the cache line may be stored into instruction cache 16. Advantageously, even though microprocessor 10 has proceeded to fetch other cache lines from instruction cache 16, the cache line of instruction bytes transferred from the main memory subsystem is still stored into instruction cache 16. However, because instruction cache 16 may be fetching other cache lines (due to a predicted-taken branch within the instruction cache line), the fetched instruction cache line remains stored in the prefetch buffer until an idle cycle in instruction cache 16 occurs. In this manner, the same port (or access point) of instruction cache 16 may be shared by the cache holding register (for updates) and the instruction fetching mechanism of microprocessor 10 (for instruction fetches). Advantageously, the area occupied within microprocessor 10 (which is typically proportional to the number of ports thereon) may be minimized.

As used herein, the term "main memory subsystem" refers to the main memory (i.e. the memory to which the addresses created by microprocessor 10 refer) coupled into a computer system employing microprocessor 10, as well as any caching employed by the computer system. Multiple levels of caching may be inserted between the main memory and microprocessor 10, according to the performance and cost needs of the computer system. Any number of levels and configurations of caching are included in the term "main memory subsystem". It is noted that, in many cases, a bus interface unit (not shown) is employed by microprocessor 10 for communicating with the main memory subsystem.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

Start bits 10000
End bits 00001
Functional bits 11000

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
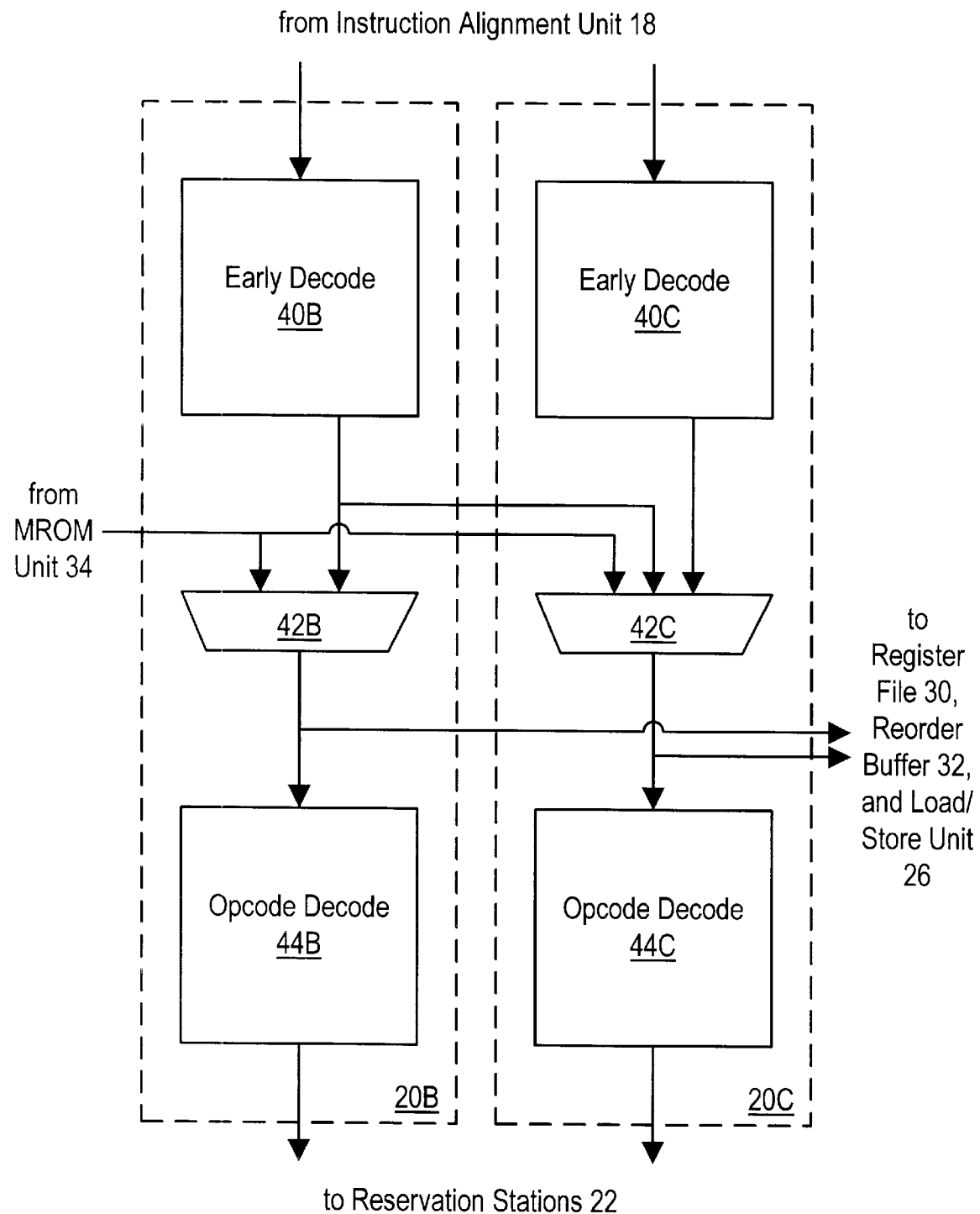
FIG. 2 is a block diagram of one embodiment of a pair of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
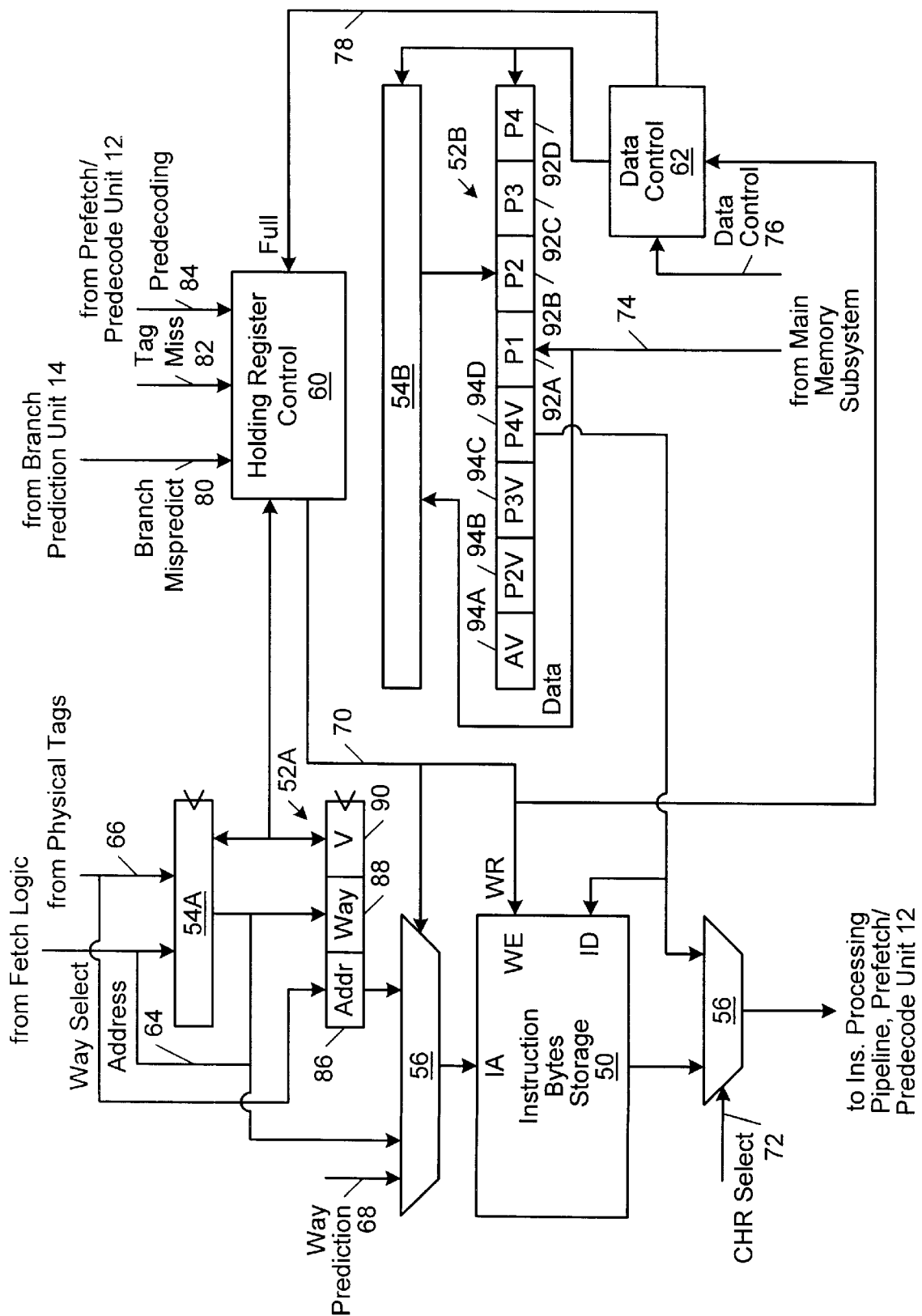
FIG. 3 is a block diagram of one embodiment of a portion of an instruction cache shown in FIG. 1.

Turning now to FIG. 3, a block diagram of one embodiment of a portion of instruction cache 16 is shown. FIG. 3 includes an instruction bytes storage 50, a first cache holding register comprising a first address portion 52A and a first data portion 52B, a second cache holding register comprising a second address portion 54A and a second data portion 54B, an input multiplexor 56, an output multiplexor 58, a holding register control unit 60, and a data control unit 62. Address portions 52A and 54A are coupled to an address bus 64 provided by the fetch logic within instruction cache 16 and a way selection bus 66 from the physical tags block (not shown). Furthermore, address portions 52A and 54A are coupled to holding register control unit 60, and second address portion 54A is coupled as an input to first address portion 52A. First address portion 52A is further coupled as an input to input multiplexor 56. Input multiplexor 56 receives address bus 64 and a way prediction upon a way prediction bus 68 as a second input. The output of input multiplexor 56 is coupled to in input address port of instruction bytes storage 50. Associated with the input address port is an input data port to which first data portion 52B is coupled. Finally, a write enable line 70 associated with the input address port and input data port is coupled to holding register control unit 60 and data control unit 62. Furthermore, the signal provided upon write enable line 70 is provided as a selection control to input multiplexor 56. The output data port of instruction bytes storage 50 is coupled as an input to output multiplexor 58, along with first data portion 52B. Output multiplexor 58 receives a CHR select line 72 as a selection control. Output multiplexor 58 provides instruction bytes to the instruction processing pipeline of microprocessor 10 and to prefetch/predecode unit 12. Data portions 52B and 54B are coupled to a data bus 74 from the main memory subsystem. A corresponding data control bus 76 is coupled to data control unit 62. Data control unit 62 is coupled to data portions 52B and 54B. Still further, data control unit 62 provides a full signal upon a full line 78 to holding register control unit 60. Holding register control unit receives a branch mispredict line 80 from branch prediction unit 14, a tag miss line 82 from the cache tags block (not shown) of instruction cache 16, and a predecoding line 84 from prefetch/predecode unit 12.

During normal operation, the fetch logic provides a fetch address upon address bus 64 based upon a branch prediction from a previous fetch address and any mispredictions/exceptions determined from instruction execution. The fetch address is selected through input multiplexor 56, along with a way prediction provided by branch prediction unit 14. Instruction bytes storage 50 then provides instructions from the cache line stored in the row of instruction bytes storage 50 selected by the address and the way selected by the way prediction. The instructions provided by instruction bytes storage 50 are then selected through output multiplexor 58 for conveyance to the instruction processing pipeline of microprocessor 10. In one embodiment, the instruction bytes are provided through the instruction scanning portion of instruction cache 16 to the instruction alignment unit 18. Prefetch/predecode unit 12 also receives the instruction bytes, in case predecoding needs to be performed upon the instruction bytes. Instruction bytes storage 50 is configured with a geometry (i.e. rows and columns of cache lines) as defined by the geometry of instruction cache 16. For example, in one embodiment instruction cache 16 is 8 way set associative and therefore instruction bytes storage 50 includes 8 ways of cache lines of instruction bytes in such an embodiment.

In parallel with accessing instruction bytes storage 50, instruction cache 16 accesses a tag storage (not shown), and compares the tags stored in the indexed row to determine if the address is indeed a hit and hits in the predicted way. If a hit in other than the predicted way is detected, then the cache line of instructions from the way which hits is provided in a subsequent clock cycle. If a miss is detected, then the first cache holding register stores the address which misses in first address portion 52A (assuming the first cache holding register is not currently storing a previous cache miss). Furthermore, upon detection of a tag miss, the fetch logic prefetches the succeeding cache line to the cache line which misses. In other words, the fetch logic adds the size of one cache line to the address which misses instruction cache 16, and provides the resulting address upon address bus 64. The prefetch address is stored into the second address portion 54A of the second prefetch register, provided the prefetch address misses instruction cache 16.

In the present embodiment, instruction cache 16 is linearly addressed. Therefore, the linear address of an instruction fetch which misses is provided to the physical tags to detect aliasing. If no alias is detected, then a way of instruction cache 16 is selected for storing the requested cache line of instructions. The selected way is provided upon way select bus 66, and is stored into the appropriate cache holding register. Additionally, holding register control unit 60 sets a valid bit within the appropriate cache holding register, indicating that the register is valid (i.e. holding a cache line of instruction bytes or a portion thereof while the cache line of instruction bytes are fetched from main memory).

As shown in first address portion 52A, several fields of information are stored in the address portion of a cache holding register. An address field 86 is included for storing the address of the cache line of instructions which misses. It is noted that, since the way is stored in a corresponding way field 88, only the index portion of the address need be stored in address field 86. However, any additional portion of the address may be stored in address field 86 according to various embodiments. A valid bit 90 is further included in first address portion 52A, indicating when set that first address portion 52A is occupied with an address corresponding to a cache line of instructions being fetched. It is noted that an index portion of an address is the portion of the address used by instruction bytes storage 50 to select a row of instruction bytes storage 50, from which the way stored in way field 88 selects a column comprising a cache line of instruction bytes for conveyance upon the output port of instruction bytes storage 50. Second address portion 54A includes similar fields as first address portion 52A.

The cache line of instruction bytes corresponding to the address stored in the cache holding register is fetched from the main memory subsystem. The data is returned in packets, wherein multiple packets comprise a cache line of instruction bytes. Each packet is provided upon data bus 74. Concurrently, control signals upon data control bus 76 indicate which packet of the cache line is being provided. As depicted in first data portion 52B, four packets comprise a cache line in the present embodiment. However, any number of packets may comprise a cache line in various embodiments. The first packet received from the main memory subsystem is the packet containing the byte identified by the offset of the fetch address which missed, and the remaining packets are received in a particular order defined for microprocessor 10. For example, one particular order may be to receive packets which include the bytes subsequent to the bytes of the first received packet, then subsequently to receive packets which include the bytes prior to the first received packet. Another order which may be used is to group the first two packets of the cache line and the last two packets of the cache line. The second packet to be received is then the other packet in the same group as the first received packet. Subsequently, the packets from the other group are received. It is noted, however, that any particular order may be used.

Data control unit 62 receives the control signals upon data control bus 76 and directs first data portion 52B or second data portion 54B to receive the packet of instruction bytes. Furthermore, data control unit 62 selects which portion of the register to store the packet in. As depicted in first data portion 52B (second data portion 54B is configured similarly), four packet fields (92A–92D) are included in the present embodiment. A set of packet valid bits 94A–94D correspond to the packet fields (i.e. packet valid bit 94A corresponds to packet field 92A, packet valid bit 94B corresponds to packet field 92B, etc.). The address stored in the first cache holding register is provided to the main memory subsystem prior to the address stored in the second cache holding register, and the cache line of instruction bytes corresponding to the address stored in the first cache holding register are provided by the main memory subsystem prior to the cache line of instruction bytes corresponding to the address stored in the second cache holding register according to the present embodiment. Therefore, data control unit 62 may determine from the packet valid bits which cache holding register is to receive the packet of instruction bytes. Alternatively, data control bus 76 may identify the cache holding register to receive the packet if packets may be returned out of order with respect to the order of presentation of the addresses.

In addition to directing the storage of a received packet of instruction bytes, data control unit 62 sets the packet valid bit corresponding to the received packet. When each of the packet valid bits within first data portion 52B have been set, the cache line of instruction bytes corresponding to the address stored in the first cache holding register have been received. Similarly, when each of the packet valid bits within second data portion 54B are set, the cache line of instruction bytes corresponding to the address stored in the second cache holding register have been received.

During the fetching of cache line of instruction bytes which missed instruction cache 16 from the main memory subsystem, microprocessor 10 is stalled from fetching additional instructions from the instruction cache. Since the instructions from the missing cache line are not available, a branch prediction cannot be made. In order to reduce stall time, prefetch/predecode unit 12 predecodes the instruction bytes as the corresponding packets are received into the cache holding register. The signal upon CHR select line 72 is asserted during such time periods, such that prefetch/predecode unit 12 may receive the instruction bytes and the packet valid bits from the first cache holding register. Using the packet valid bits, prefetch/predecode unit 12 may determine which instruction bytes have been received and may predecode the received bytes. The predecode data thus generated is provided to the instruction processing pipeline so that the identified instructions can be dispatched, and the predecode data is further stored in a predecode data storage (not shown). The predecode data storage is configured into a similar geometry to the instruction bytes storage 50.

If, during predecoding of the cache line of instruction bytes, a predicted-taken branch is detected within the cache line of instruction bytes, prefetch/predecode unit 12 provides branch prediction information corresponding to the predicted-taken branch instruction to the branch prediction unit 14. The fetch logic within instruction cache 16 receives the branch prediction and fetches, via address bus 64, the predicted target address. If the target address is a hit in instruction cache 16, then the instructions fetched therefrom are dispatched into the instruction processing pipeline of microprocessor 10. Advantageously, if a predicted-taken branch instruction is encountered, the instructions at the target address of the branch instruction may be fetched prior to receiving the entire cache line of instruction bytes which includes the predicted-taken branch instruction. Upon detection of the predicted-taken branch instruction, the signal upon CHR select line 72 is deasserted to allow fetching of the target cache line and any subsequent cache lines as the fetch logic may dictate. Prefetch/predecode unit 12 interrupts predecoding of the bytes stored in the cache holding register upon detection of the predicted taken branch, thereby becoming available for predecoding instruction bytes fetched from instruction bytes storage 50 in response to the predicted-taken branch instruction.

Even though instruction cache 16 begins fetching subsequent cache lines, the remaining packets of the cache line containing the predicted branch instruction (and the cache line prefetched according to the prefetch address, if applicable), continue to be received into the cache holding registers. Eventually, all of the packets for the cache line of instruction bytes containing the predicted-taken branch instruction are received. Once all of the packets have been received, the cache line of instruction bytes may be stored into instruction bytes storage 50. However, to be able to arbitrarily store the cache line of instruction bytes into instruction bytes storage 50 at any time, a second port into instruction bytes storage 50 would be required. Instead of adding a second port (which may increase the area required to implement instruction bytes storage 50 dramatically), the cache line remains stored in the first cache holding register until an idle cycle in the instruction bytes storage occurs. Upon occurrence of the idle cycle, holding register control unit 60 selects first address portion 52A via multiplexor 56 into the input address port of instruction bytes storage 50 and asserts the signal upon write enable line 70 to instruction bytes storage 50. Instruction bytes storage 50 receives the instruction bytes from first data portion 52B and stores the instruction bytes into the indexed row and way of the instruction bytes storage.

Idle cycles for instruction bytes storage 50 may occur in a variety of fashions. Generally, an idle cycle occurs when the fetch logic does not have a new fetch address to present upon address bus 64. For the present embodiment, three events are considered to be idle cycles: (i) a branch misprediction is detected by microprocessor 10; (ii) an instruction fetch is determined to miss instruction cache 16 and the cache holding registers are not empty; and (iii) the cache line stored in the first cache holding register is being predecoded by prefetch/predecode unit 12. Case (i) is an idle cycle because a clock cycle is needed to translate the logical address provided upon detection of the branch misprediction into a linear address for presentation to instruction cache 16. During the translation cycle, no fetch address is available from the fetch logic since the next fetch address to be conveyed is the corrected branch target address being translated. Case (i) is detected by holding register control unit 60 via a branch mispredict signal upon branch mispredict bus 80.

When an instruction fetch misses instruction cache 16 and the cache holding registers are not empty, then the missing fetch address (or the subsequent prefetch address) may not have a cache holding register to be allocated for it. For simplicity, the cache miss stalls until the cache holding registers empty (e.g. case (ii)). However, the request for the missing fetch address may be released with respect to beginning a transfer from the main memory subsystem. Since multiple clock cycles elapse before the data is returned, the cache holding registers are empty prior to the return of any data for the missing fetch address. The empty registers may then be used to store the data corresponding to the missing fetch address. Case (ii) is detected by holding register control unit 60 via a tag miss signal upon tag miss line 82 and valid bit 90 being set in either or both of address portions 52A and 54A.

Finally, case (iii) occurs if prefetch/predecode unit 12 is predecoding the cache line in the first cache holding register. Prefetch/predecode unit 12 predecodes instructions from the cache line of instruction bytes in the cache holding register when those instructions are needed by the instruction processing pipeline of microprocessor 10. Therefore, instruction bytes are being provided from first data portion 52B, and therefore instruction bytes storage 50 is idle. Case (iii) is detected via assertion of a predecoding signal upon predecoding line 84. Prefetch/predecode unit 12 asserts the predecoding signal when instruction bytes from the cache holding register are being predecoded. Instruction bytes are being predecoded during the initial fetch of the instruction bytes (e.g. prior to the detection of any predicted-taken branch instruction). Additionally, if a fetch address is presented upon address bus 64 and the address lies within the cache line being fetched via the first cache holding register, then CHR select line 72 is asserted and predecoding resumes upon the instruction bytes stored therein.

Holding register control unit 60 makes use of the idle cycle to update instruction bytes storage 50 in any of the idle cases if the complete cache line of instruction bytes has been provided to the first cache holding register (e.g. each of the packet valid bits 94A–94D is set). Data control unit 62 indicates to holding register control unit 60 that the complete cache line of instruction bytes has been provided by asserting a signal upon full line 78. It is noted that, according to one embodiment, holding register control unit 60 causes an update of a partially received cache line if case (iii) is detected.

In case (iii), a partial cache line may be stored into instruction bytes storage 50 (and corresponding partial predecode data may be stored into a predecode data storage array, not shown, as well). Therefore, it is possible to detect both a cache hit and a hit in the cache holding register concurrently. For such a case, if valid partial predecode data is stored in the predecode data array, then the instruction bytes from instruction bytes storage 50 are used for predecoding. If invalid predecode data is stored in the predecode data array, then the instruction bytes stored in the cache holding register are used for predecoding.

Upon storing the complete cache line stored in the first cache holding register into instruction bytes storage 50, holding register control unit 60 shifts the contents of the second cache holding register into the first cache holding register. Upon receiving the complete prefetched cache line of instruction bytes and detecting an idle cycle in instruction bytes storage 50, the prefetched cache line may be stored into instruction bytes storage 50 from the first cache holding register. Once the cache lines of instructions from the first and second cache holding registers have been stored into instruction bytes storage 50, the cache holding registers are considered empty and may be allocated to a subsequent instruction cache miss.

It is noted that instruction bytes storage 50, through output multiplexor 58, may be configured to provide a portion of a cache line to the instruction processing pipeline and prefetch/predecode unit 12. In one embodiment, 32 byte cache lines are divided into an upper 16 byte portion and a lower 16 byte portion. The 16 byte portion containing the offset of the fetch address is selected for conveyance via output multiplexor 58.

Figure 4:
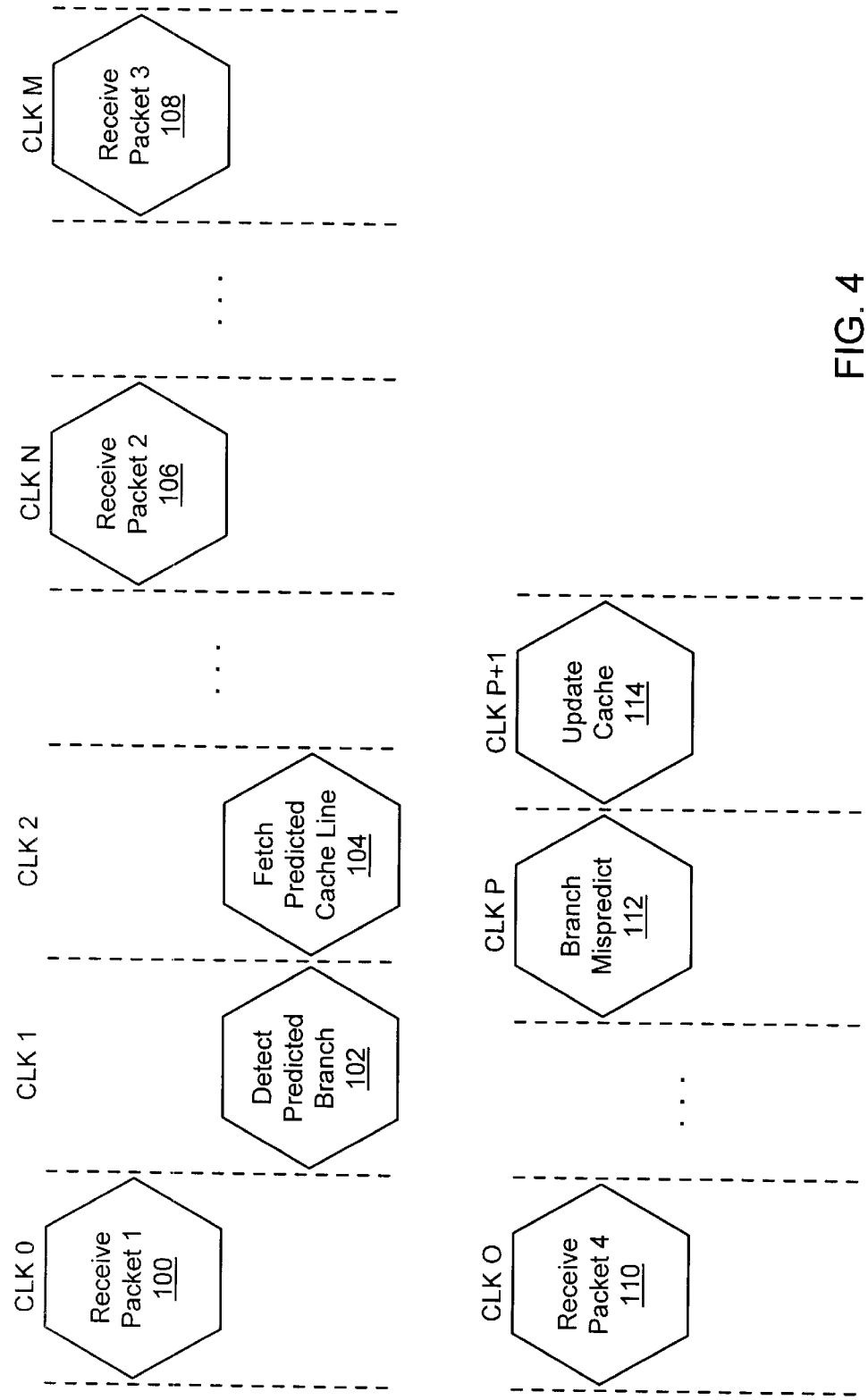
FIG. 4 is a timing diagram illustrating operation of certain components shown in FIG. 3.

Turning next to FIG. 4, a timing diagram illustrating operation of the cache holding register according to one exemplary set of events is shown. In FIG. 4, clock cycles are delineated by vertical dashed lines and labeled thereabove. The clock cycles depicted in FIG. 4 show events occurring subsequent to the detection of a fetch miss in instruction cache 16. The instructions being fetched include a predicted-taken branch instruction in the first packet of instruction bytes received, according to this example. Certain clock cycles shown in FIG. 4 are labeled with letters instead of numbers (e.g. CLKN versus CLK0). The letters are intended to represent an arbitrary number indicating an arbitrary number of clock cycles elapsing at each set of ellipses shown in FIG. 4. However, it is intended that N<M<O<P.

During a clock cycle CLK0, a first packet of instruction bytes is received into the first cache holding register (reference number 100). Prefetch/predecode unit 12 begins predecoding the instruction bytes received in the first packet of instructions, and detects a predicted-taken branch instruction within the first packet (reference number 102 in clock cycle CLK1). Upon receipt of the predicted target address, the fetch logic begins fetching the target cache line (reference number 104). The fetch logic may continue to fetch instructions down the target path as long as no branch mispredictions nor cache misses are detected within the target path.

During subsequent clock cycles (CLKN, CLKM, and CLKO in FIG. 3), the remaining packets of the cache line of instruction bytes stored in the first cache holding register are received (reference numbers 106, 108, and 110). After receiving the remaining packets, a branch misprediction is detected by microprocessor 10 (reference number 112, clock cycle CLKP). The branch misprediction may be for any previously predicted branch instruction, not only the branch instruction predicted in CLK1. While the corrected target address is translated, the contents of the first cache holding register are stored into instruction bytes storage 50 (reference number 114, clock cycle CLKP+1).

As FIG. 4 illustrates, microprocessor 10 begins fetching the target of the predicted-taken branch instruction as soon as the predicted-taken branch instruction is detected. The cache line containing the predicted-taken branch is subsequently stored into instruction cache 16, and an additional port is not added to the instruction bytes storage in order to store the cache line at a later time after the fetch logic has begun fetching down a predicted instruction path.

Figure 5:
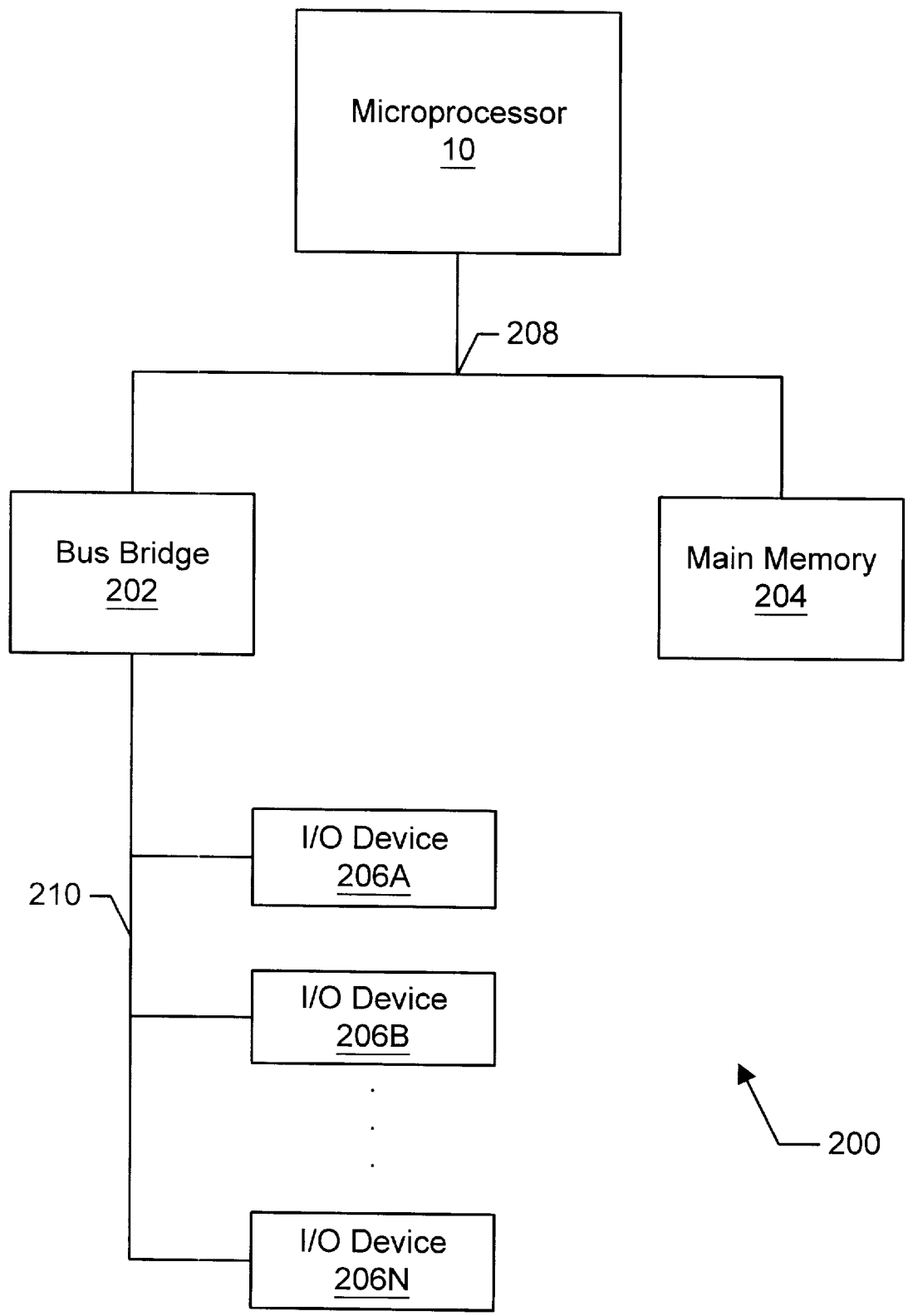
FIG. 5 is a block diagram of a computer system including the microprocessor shown in FIG. 1.

Turning now to FIG. 5, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 5 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |

TABLE 1-continued x86 Fast Path, Double Dispatch, and MROM Instructions

| X86 Instruction | Instruction Category |
|---|---|
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |

TABLE 1-continued x86 Fast Path, Double Dispatch, and MROM Instructions

| X86 Instruction | Instruction Category |
|---|---|
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including a memory operand for which two addressing registers are used are also considered double dispatch instructions.

In accordance with the above disclosure, a microprocessor has been described which includes one or more cache holding registers for allowing a remainder of a cache line to be fetched after a predicted-taken branch instruction is detected within the cache line. The cache holding register holds the cache line until an idle cycle occurs in the instruction cache, at which time the cache line is stored therein.

Numerous variations and modifications will become apparent to those skilled in the art once the above disclosure is fully appreciated. It is intended that the following claims be interpreted to embrace all such variations and modifications.

What is claimed is:

1. A method for retrieving a cache line of instruction bytes from a main memory subsystem and storing the cache line of instruction bytes into an instruction cache of a microprocessor, comprising:

allocating a cache holding register for said cache line of instruction bytes, wherein said cache holding register is configured to store an address corresponding to said cache line of instruction bytes, and wherein said cache holding register further includes storage for said cache line of instruction bytes;

receiving one or more packets of instruction bytes into said cache holding register, said one or more packets including a predicted-taken branch instruction, said one or more packets of instruction bytes included within said cache line of instruction bytes;

predecoding said one or more packets of instruction bytes as said one or more packets of instruction bytes are received into said cache holding register, thereby detecting said predicted-taken branch instruction;

fetching a target cache line of instruction bytes from said instruction cache in response to said predicted-taken branch instruction, said target cache line identified by a target address of said predicted-taken branch instruction;

receiving remaining packets of instruction bytes into said cache holding register subsequent to said fetching;

storing said cache line of instruction bytes into said instruction cache subsequent to said receiving remaining packets;

concurrently detecting a hit in said instruction cache and a hit in said cache holding register for a particular fetch address;

predecoding instruction bytes from said instruction cache if predecode data corresponding to said particular fetch address and stored in said instruction cache is partially valid; and predecoding instruction bytes from said cache holding register if predecode data corresponding to said particular fetch address and stored in said instruction cache is invalid.

2. The method as recited in claim 1 wherein said storing is performed upon occurrence of an idle cycle in said instruction cache.

3. The method as recited in claim 2 wherein said idle cycle occurs upon presentation of a fetch address to said instruction cache which misses said instruction cache.

4. The method as recited in claim 2 wherein said idle cycle occurs upon detection of a mispredicted branch instruction.

5. The method as recited in claim 4 wherein said idle cycle is a clock cycle in which a corrected fetch address generated upon detection of said mispredicted branch instruction is translated.

6. The method as recited in claim 2 wherein said idle cycle comprises a clock cycle in which a predecode unit is predecoding said remaining packets of said cache line of instruction bytes.

7. The method as recited in claim 2 wherein said storing is performed using a particular port of said instruction cache, wherein said particular port is also used to fetch instructions from said instruction cache.

8. The method as recited in claim 1 further comprising prefetching a second cache line of instruction bytes, wherein said second cache line of instruction bytes succeeds said cache line of instruction bytes within said main memory subsystem.

9. The method as recited in claim 8 further comprising allocating a second cache holding register for storing said second cache line of instruction bytes.

10. The method as recited in claim 9 further comprising shifting a contents of said second cache holding register into said cache holding register upon said storing said cache line of instruction bytes.

11. A microprocessor comprising:

an instruction cache including: (i) an instruction bytes storage configured to store cache lines of instruction bytes, and (ii) a cache holding register configured to store an address of a first cache line of instruction bytes being fetched from a main memory subsystem, and wherein said cache holding register is further configured to store said first cache line of instruction bytes, and wherein said instruction cache is coupled to receive, into said cache holding register, said first cache line of instruction bytes in a plurality of packets from said main memory subsystem; and a predecode unit coupled to said instruction cache, wherein said predecode unit is configured to predecode each one of said plurality of packets as said one of said plurality of packets is received into said cache holding register, and wherein said predecode unit is configured to provide a target address of a predicted-taken branch instruction upon predecoding said predicted-taken branch instruction within said one of said plurality of packets;

wherein said instruction cache is configured to fetch a target cache line in response to said target address, and wherein said instruction cache is configured to receive remaining ones of said plurality of packets into said cache holding register subsequent to fetching said target cache line, and wherein said instruction cache is configured to store said first cache line of instruction bytes into said instruction bytes storage if said fetch address is inhibited; and wherein said instruction cache is configured to concurrently detect a hit by a particular fetch address in said instruction bytes storage and in said cache holding register, and wherein said predecode unit is configured to predecode instruction bytes from said instruction bytes storage if predecode data corresponding to said particular fetch address and stored in said instruction cache is partially valid, and wherein predecode unit is configured to predecode instruction bytes from said cache holding register if predecode data corresponding to said particular fetch address and stored in said instruction cache is invalid.

12. The microprocessor as recited in claim 11 wherein said fetch address is inhibited during a clock cycle in which a fetch address is determined to miss said instruction cache.

13. The microprocessor as recited in claim 11 wherein said fetch address is inhibited in response to detecting a mispredicted branch instruction within said microprocessor.

14. The microprocessor as recited in claim 13 wherein said fetch address is inhibited during a clock cycle in which a corrected fetch address corresponding to said mispredicted branch instruction is translated.

15. The microprocessor as recited in claim 11 wherein said fetch address is inhibited during a clock cycle in which said predecode unit is predecoding said remaining ones of said plurality of packets.

16. The microprocessor as recited in claim 11 wherein said instruction cache further comprises a second cache holding register configured to store an address of a second cache line of instruction bytes being fetched from said main memory subsystem, and wherein said second cache holding register is further configured to store said second cache line of instruction bytes.

17. The microprocessor as recited in claim 16 wherein said instruction cache is configured to shift a contents of said second cache holding register into said cache holding register in response to storing said first cache line of instruction bytes into said instruction bytes storage.

18. A computer system comprising:

a microprocessor including:

an instruction cache including: (i) an instruction bytes storage configured to store cache lines of instruction bytes, and (ii) a cache holding register configured to store an address of a first cache line of instruction bytes being fetched from a main memory subsystem, and wherein said cache holding register is further configured to store said first cache line of instruction bytes, and wherein said instruction cache is coupled to receive, into said cache holding register, said first cache line of instruction bytes in a plurality of packets from said main memory subsystem; and a predecode unit coupled to said instruction cache, wherein said predecode unit is configured to predecode each one of said plurality of packets as said one of said plurality of packets is received into said cache holding register, and wherein said predecode unit is configured to provide a target address of a predicted-taken branch instruction upon predecoding said predicted-taken branch instruction within said one of said plurality of packets;

wherein sad instruction cache is configured to fetch a target cache line in response to said target address, and wherein said instruction cache is configured to receive remaining ones of said plurality of packets into said cache holding register subsequent to fetching said target cache line, and wherein said instruction cache is configured to store said first cache line of instruction bytes into said instruction bytes storage if said fetch address is inhibited;

wherein said instruction cache is configured to concurrently detect a hit by a particular fetch address in said instruction bytes storage and in said cache holding register, and wherein said predecode unit is configured to predecode instruction bytes from said instruction bytes storage if predecode data corresponding to said particular fetch address and stored in said instruction cache is partially valid, and wherein predecode unit is configured to predecode instruction bytes from said cache holding register if predecode data corresponding to said particular fetch address and stored in said instruction cache is invalid; and an input/output (I/O) device configured to be in communication between said computer system and another computer system to which said I/O device is coupled.

19. The computer system as recited in claim 18 wherein said I/O device comprises a modem.

* * * * *